(12) United States Patent
Puchalla-König et al.

(10) Patent No.: US 12,436,058 B2
(45) Date of Patent: Oct. 7, 2025

(54) SNIFFER PROBE WITH SHIELDING

(71) Applicant: INFICON GMBH, Cologne (DE)

(72) Inventors: Jochen Puchalla-König, Cologne (DE); Erik Rolff, Cologne (DE); Silvio Decker, Cologne (DE)

(73) Assignee: INFICON GMBH, Cologne (DE)

( * ) Notice: Subject to any disclaimer, the term of this patent is extended or adjusted under 35 U.S.C. 154(b) by 251 days.

(21) Appl. No.: 17/795,167

(22) PCT Filed: Jan. 12, 2021

(86) PCT No.: PCT/EP2021/050430
§ 371 (c)(1),
(2) Date: Jul. 25, 2022

(87) PCT Pub. No.: WO2021/156021
PCT Pub. Date: Aug. 12, 2021

(65) Prior Publication Data
US 2023/0080807 A1 Mar. 16, 2023

(30) Foreign Application Priority Data
Feb. 3, 2020 (DE) .................. 10 2020 102 630.7

(51) Int. Cl.
*G01M 3/16* (2006.01)
*G01M 3/20* (2006.01)
(52) U.S. Cl.
CPC ............... *G01M 3/16* (2013.01); *G01M 3/20* (2013.01)

(58) Field of Classification Search
CPC .......... G01M 3/16; G01M 3/20; G01M 3/205; G01N 1/24
See application file for complete search history.

(56) References Cited

U.S. PATENT DOCUMENTS

| 3,528,279 A | | 9/1970 | Claude et al. | |
| 4,576,038 A | * | 3/1986 | Dixon | G01M 3/04 73/40.7 |
| 9,097,624 B1 | | 8/2015 | Bottiger | |

(Continued)

FOREIGN PATENT DOCUMENTS

| CN | 203 811 332 U | | 9/2014 |
| CN | 109729568 | * | 5/2019 |

(Continued)

OTHER PUBLICATIONS

Translation of CN109729568.*

(Continued)

*Primary Examiner* — Helen C Kwok
(74) *Attorney, Agent, or Firm* — Dickinson Wright PLLC

(57) ABSTRACT

The invention relates to a sniffer probe (10) for drawing in gas when searching for gas leaks, the sniffer probe having at least one sniffer tip (11), and an intake opening (16) being provided which is connected via a connecting line to a main sniffer line which can be connected to a gas leak detector. The sniffer tip (11) is provided in the region of the intake opening (16) with flexible elongated shielding elements (30) which project from the sniffer tip (11) in such a way that the intake opening (16) is shielded from the exterior environment (38) of the sniffer probe (10) on all sides.

14 Claims, 2 Drawing Sheets

(56) References Cited

U.S. PATENT DOCUMENTS

| | | | | |
|---|---|---|---|---|
| 2004/0194533 A1* | 10/2004 | Bohm | ............... | G01M 3/205 73/864.34 |
| 2008/0000288 A1* | 1/2008 | Bley | ............... | G01M 3/205 73/40.7 |
| 2008/0276692 A1* | 11/2008 | Wetzig | ............... | G01M 3/205 73/40.7 |
| 2016/0202138 A1* | 7/2016 | Wetzig | ............... | G01M 3/20 73/40.7 |
| 2019/0212221 A1* | 7/2019 | Decker | ............... | G01M 3/205 |
| 2020/0256771 A1* | 8/2020 | Decker | ............... | G01M 3/205 |

FOREIGN PATENT DOCUMENTS

| | | |
|---|---|---|
| CN | 109791087 A | 5/2019 |
| EP | 0 138 370 A2 | 4/1985 |
| JP | S60-88339 A | 5/1985 |
| JP | 2016-529502 A | 9/2016 |
| JP | 2018-159563 A | 10/2018 |
| JP | 2019-533146 A | 11/2019 |
| WO | 2015028336 A1 | 3/2015 |
| WO | 2018050879 A1 | 3/2018 |

OTHER PUBLICATIONS

International Search Report and Written Opinion dated Apr. 23, 2021, which issued in the corresponding PCT Patent Application No. PCT/EP2021/050430.

* cited by examiner

SNIFFER PROBE WITH SHIELDING

The invention relates to a sniffer probe of a gas leak detector for searching for gas leaks.

In searching for gas leaks, sniffer probes are used to be passed along the surface of a test object in the region of an assumed gas leak. To this end, the sniffer probe has a sniffer tip provided with a gas intake opening through which the gas-air mixture to be analyzed is drawn in. Typically, a main sniffer line connects the rear end of the sniffer probe opposite the gas intake opening to the gas leak detector in which the analysis of the drawn-in gas is performed.

In the automated sniffer leak detection at pipes, it is a difficulty to detect gas leaks on the rear of the pipes examined. With conventional sniffer probes, the gas flow must be increased in order to draw in leakage gas with air from the rear of the relevant pipes. Thereby, the sensitivity of the gas leak detection is reduced. Alternatively, the probe has to be passed around the pipe which takes time. In particular with pipelines of refrigerators, it is difficult to increase the gas flow such that leaks of a magnitude of 0.5 g/a are detected on the rear of the pipes examined.

It is an object of the present invention to provide a sniffer probe with which in particular the detection of leaks on the rear of examined pipes is facilitated.

The leak detection device of the invention is defined by the features of claim 1.

Accordingly, the invention is a sniffer probe with at least one sniffer tip which has an intake opening. A connecting line, preferably extending in the sniffer probe, e.g. in the sniffer tip, connects the intake opening to a main sniffer line which can be connected or is connected to the gas leak detector.

According to the invention, the sniffer tip has flexible elongated shielding elements in the region of the intake opening, which protrude from the sniffer tip such that the intake opening is shielded from the outer environment of the sniffer probe on all sides. A shielding on all sides means that a distance of at most circa a few millimeters, preferably less that one millimeter, remains between adjacent shielding elements, through which distance gas flows from the outer environment to the intake opening and is drawn in by the same.

Thus, the shielding elements can form a test cavity for the test object to be examined, adjoining the intake opening, the sniffer tip and the shielding elements protruding therefrom enclosing said cavity completely except for a small distance which should preferably be at most approximately one tenth of the diameter of the intake opening, so that the test cavity is shielded from the outer environment of the sniffer probe by the shielding elements. The sniffer probe and the shielding elements protruding therefrom thus form, as it were, the walls of the test cavity, the walls being permeable to gas in the region of the shielding elements and reducing gas turbulences, for example in the event of gusts.

The distance between adjacent shielding elements should not be greater than about one tenth and preferably about one hundredth of the intake opening diameter. For an intake opening diameter of 4 mm, the distances between adjacent shielding elements should thus be less than 0.4 mm and preferably less than 40 µm. The intake opening diameter means the maximum distance between opposing edges of the intake opening, so that the term "diameter" does not necessarily require a circular intake opening.

The sniffer tip may be designed as an arm of the sniffer tip. In particular, the sniffer probe can comprise a plurality, for example two, arms between which the test cavity is formed. The shielding elements protrude from at least one of the arms.

At least one of the arms has its side facing the test cavity provided with at least one, preferably a plurality of flexible shielding elements which preferably protrude at right angles from the arm and define the test cavity and thereby shield the intake opening from the outer environment of the sniffer probe. The shielding elements may be elastic fiber elements and/or brush-type bristles. The shielding elements shield the sniffer tip and the intake opening from the outer environment of the sniffer probe such that, when drawing in gas, the movement of air occurs primarily from outside the sniffer probe inward into the interior of the cavity, so that the main sniffer line draws primarily from the interior of the test cavity. This reduces effects of air turbulences in the region outside the sniffer probe on the intake of gas that has escaped through a leak.

The shielding elements may be formed a flexible fibers, with a plurality of fibers being arranged so closely side by side that the fibers provide a delimitation in the manner of a wall that shields the test cavity 20 from the outer environment of the sniffer probe. As an alternative, the shielding elements may also be provided in the form of flexible walls.

The shielding elements are advantageously arranged in an edge region of the inner side of the respective arm, which faces the test cavity, and, as is further preferred, in all edge regions of each arm, such that the shielding elements delimit the test cavity completely in order to shield the interior of the test cavity and the intake opening from the outer environment of the sniffer probe.

When the sniffer probe is pushed over an object to be tested, such as e.g. a pipe, the fiber element or the fiber elements give to the test object and enclose the section of the test object located in the test cavity and shield the same from the outer environment. In this manner, a kind of mobile test chamber for the test object is formed, wherein the test chamber can be pushed over the test object. When the test cavity is evacuated through the intake opening of the sniffer probe, gas such as air, for example, flows from the outer environment of the sniffer probe past the shielding elements from the outside into the test cavity, while it is prevented that air turbulences in the outer environment of the sniffer probe swirl gas that, within the test cavity, escapes from the test object through a leak in the region shielded by the shielding elements.

Advantageously, each of the two arms is provided with the shielding elements, so that the shielding elements extend from mutually opposite sides into the space between the two arms. Here, it is advantageous if at least some of the shielding elements extend approximately to the middle of the distance between the arms, so that the test cavity is shielded at least for the greater part from the environment by the shielding elements.

Each shielding element comprises a first end arranged at the respective arm and a second end opposite the first end. The distance between the second ends of mutually opposite shielding elements which extend towards each other from different arms, should be small and possibly smaller than $\frac{1}{10}$ and preferably smaller than $\frac{1}{100}$ of the intake opening diameter.

In order to avoid that a test object, such as e.g. a pipe to be sniffed, positioned in the test cavity bends the shielding elements and creates a free space without shielding elements, shielding elements of at least two different lengths may be provided so that at least shorter shielding elements shield the cavity thus formed from the outer environment.

Overall, as many edge regions of the test cavity as possible should be penetrated by shielding elements, even when a test object is positioned in the test cavity and bends the local shielding elements.

For this purpose, the shielding elements of different lengths can be arranged in rows, where each row can comprise shielding elements of the same length and rows with shielding elements of different lengths alternate.

Preferably, the intake opening should be surrounded or shielded at least for the greater part and preferably completely by shielding elements.

The sniffer probe can be designed in the manner of a fork and be formed in the region of a front end of the respective arm, while the rear ends of the arms opposite the front ends are connected with each other.

The rear ends of the arms preferably terminate in a common base element which may, for example, be designed as a handle and includes the main sniffer line. The arms may be formed in a Y- or U-shape, with a U-shaped design being advantageous. In case of a U-shaped design of the arms, the intake openings are formed on the inner sides of the respective arms facing the test cavity and in the front-end regions thereof. The U-shaped fork can then simply be pushed over a pipe line in such a manner that the pipe line to be sniffed is contained in the test cavity, so that the intake opening can sniff one of the sides of the test object, e.g. the pipe line to be tested.

The inner sides of the arms facing the test cavity are preferably arranged in parallel with respect to each other in the region of the front ends, so that the shielding elements also extend in parallel to each other.

An embodiment of the invention will be explained in detail hereunder with reference to the Figures.

Figure 1:
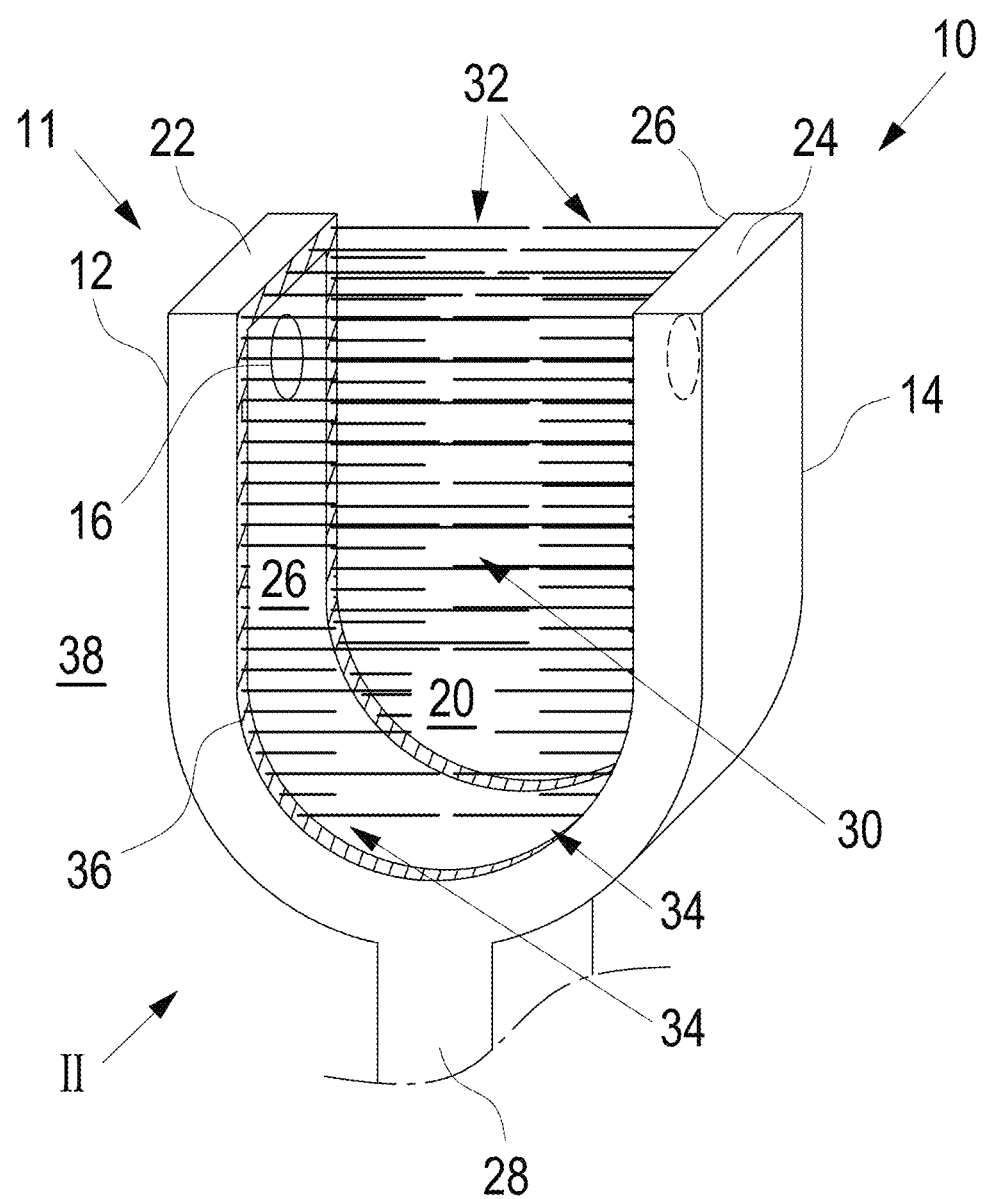
FIG. 1 is a perspective illustration of the embodiment.
Figure 2:
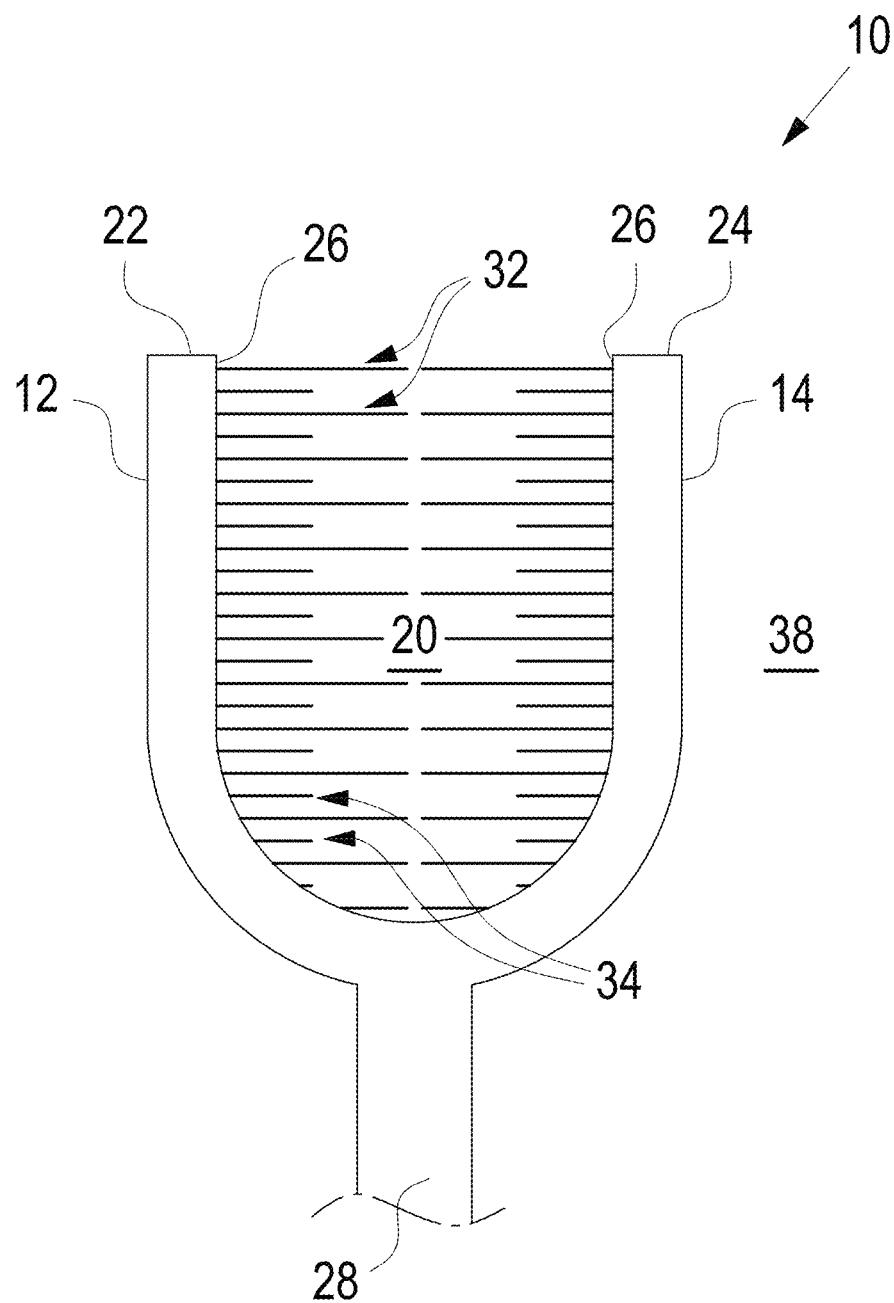
FIG. 2 is a view in the direction of the arrow II in FIG. 1.

The sniffer probe has two arms 12, 14 that form an U. The rear ends of the two arms 12, 14 are integrally connected with a central base element 28, in which a main sniffer line, not illustrated in the Figure, is contained that is connected to the gas leak detector. The front ends 22, 24 of the two arms 12, 14 opposite the rear ends are formed spaced from each other, such that a test cavity 20 for the pipeline to be examined is formed between them.

On opposing sides of the test cavity 20, intake openings 16, 18 are formed on the inner sides 26 of the two arms 22, 24 adjoining the test cavity 20. As an alternative, it is conceivable that only one of the two arms 22, 24 is provided with an intake opening 16, while the other arm 24 has no intake opening 18 or the only intake opening 16 is located centrally at or in the region of the base element 28 between the two arms. As an alternative, the intake opening can be introduced into the shielded region using a capillary.

Each intake opening 16, 18 is formed in the front region of the front end 22, 24 of the respective arm 12, 14. Each intake opening 16, 18 is connected to the main sniffer line in a gas-conducting manner via a separate connecting line which extends in the respective arm 12, 14 and is not illustrated in the Figures.

The inner sides 26 of the two arms 12, 14 are arranged parallel to each other in the region of the front ends 22, 24, so that the sniffer probe 10 can be oriented with respect to the pipeline to be examined such that the region of the pipeline that is to be tested is contained in the test cavity 20.

From the inner sides 26 of both arms 12, 14, flexible shielding elements in the form of elastic fibers or brush hairs project in the manner of a brush and protrude into or border the test cavity 20. The shielding elements 30 are arranged in parallel to each other.

The shielding elements are arranged exclusively in the edge region 36 of the inner sides 26 of the two arms 12, 14. The wall region 36 delimits the inner sides to the outside and encloses the intake opening 16, 18 completely. Thereby, the shielding elements projecting from the inner sides 26 in the edge regions 36 form a gas-permeable wall that shields the test cavity 20 from the outer environment 38 of the sniffer probe 10.

Each of the two arms 12, 14 is provided with one or more rows 32 of longer shielding elements 30 and/or with one or more rows 34 of shorter shielding elements 30. The shielding elements of the rows 34 are formed shorter than the shielding elements 30 of the rows 32. The rows 32 and the rows 34 alternate. so that one row 34 is arranged between two adjacent rows 32 and vice versa. The longer shielding elements 30 of the rows 32 each extend to the center of the test cavity 20, so that the shielding elements 30 of the rows 32 almost contact each other in the region of the center of the test cavity 20. In contrast, the shorter shielding elements 30 of the rows 34 are each formed to be only about half as long as the shielding elements 30 of the rows 32, so that in the region of the center of the test cavity 20, a space for a test object remains between mutually opposite shielding elements 30 of the rows 34 that extend from mutually opposite arms 22, 24 and surround or shield the test cavity 20. Thereby, a test object introduced into the test cavity 20 bends the longer shielding elements 30 of the rows 32 more than the shorter shielding elements 30 of the rows 34.

As an alternative, it is conceivable that the longer and the shorter shielding elements 30 alternate without being arranged in rows of the same length. Here, one shorter fiber element 30 can be surrounded respectively by a plurality of longer shielding elements and vice versa.

The shielding elements 30 shield the intake opening 16 form the outer environment of the sniffer probe 10 in such a manner that the effects of air turbulences in the region outside the test cavity 20 on the air flow within the test cavity 20 and in the direction of the intake opening 16 or 18 are reduced.

In a further embodiment not illustrated in the Figures, only one arm configured as a sniffer tip is provided, which has an intake opening in the region of the sniffer tip. Here, flexible elongated shielding elements protrude in the region of the intake opening. The shielding elements may be bristle-like elongated fibers and/or flexible walls. It is of importance to the invention that the test cavity adjoining the intake openings is shielded by the shielding elements from the outer environment of the sniffer probe om all sides, so that a distance of at most ⅕ of the intake opening diameter and preferably less than ¹/₁₀ or less than ¹/₁₀₀ of the diameter remains between adjacent shielding elements. The shielding elements form walls that enclose and/or define the test cavity completely.

The invention claimed is:

1. A sniffer probe for drawing in gas, the sniffer probe having at least one sniffer tip provided with an intake opening which is connected via a connecting line to a main sniffer line which can be connected to a gas leak detector, wherein, in a region of the intake opening, the sniffer tip is with flexible elongated shielding elements which project from the sniffer tip in such a way that the intake opening is shielded from an outer environment of the sniffer probe by means of the shielding elements forming flexible, gas permeable walls of a test cavity for a test object to be examined, wherein said test cavity adjoins the intake opening, wherein the sniffer tip and the shielding elements surround the test cavity essentially entirely and thereby shield the test cavity from the outer environment of the sniffer probe to all sides, and wherein the sniffer probe further comprises at least two separate arms between which the test cavity is formed, at least one of the arms having the intake opening on a side facing the test cavity.

2. The sniffer probe according to claim 1, wherein a distance between adjacent shielding elements is less or equal to approximately 1/10 of an intake opening diameter.

3. The sniffer probe according to claim 1, wherein a plurality of shielding elements surrounds the intake opening.

4. The sniffer probe according to claim 1, wherein a plurality shielding elements is provided in a form of flexible.

5. The sniffer probe according to claim 1, wherein the shielding elements are provided as first shielding elements with a first length and at least second shielding elements with a second length different from said first length wherein said first shielding elements arranged in first rows and said second shielding elements are arranged in second rows, wherein the first rows are alternating with the second rows.

6. The sniffer probe according to claim 1, wherein at least some of the shielding elements surround the greater part of the test cavity.

7. The sniffer probe according to claim 1, wherein the intake opening is formed on an inner side of a respective arm, which faces the test cavity.

8. The sniffer probe according to claim 1, wherein the shielding elements are arranged exclusively in an edge region of a side of the arms which faces a test chamber, said edge region delimiting the test chamber from the outer environment.

9. The sniffer probe according to claim 1, wherein the shielding elements are arranged on the two arms on opposite sides of the test cavity, wherein said two arms border the test cavity or wherein said two arms shield the test cavity from the environment.

10. The sniffer probe according to claim 9, wherein at least some of the shielding elements extend to approximately a center of the test cavity.

11. The sniffer probe according to claim 1, wherein the two arms are connected with each other at rear ends of the two arms in the manner of a fork and have the intake openings at front ends of the two arms opposite the rear ends.

12. The sniffer probe according to claim 11, wherein the two arms are formed in U-shape.

13. The sniffer probe according to claim 12, wherein inner sides of the two arms are formed to be parallel to each other in the region of the front ends of the two arms.

14. The sniffer probe according to claim 1, wherein the arms are connected at rear ends of the arms to a base element which comprises the main sniffer line and can be connected to the gas leak detector.

\* \* \* \* \*